United States Patent [19]
Treharne

[11] Patent Number: 5,684,339
[45] Date of Patent: Nov. 4, 1997

[54] METHOD AND APPARATUS FOR ENHANCED VEHICLE PROTECTION

[75] Inventor: William D. Treharne, Farmington Hills, Mich.

[73] Assignee: Ford Global Technologies, Inc., Dearborn, Mich.

[21] Appl. No.: 781,077

[22] Filed: Jan. 9, 1997

Related U.S. Application Data

[62] Division of Ser. No. 586,448, Jan. 16, 1996, Pat. No. 5,637,926.
[51] Int. Cl.$^6$ .................................................. B60R 25/04
[52] U.S. Cl. .................................... 307/10.5; 180/287
[58] Field of Search .............................. 307/9.1–10.6; 180/287; 70/237, 277, 228, 252, 370; 123/198 DB, 198 DC; 340/425.5, 426, 825.3–825.32, 825.34, 825.44, 825.54, 825.69, 825.72

[56] References Cited

U.S. PATENT DOCUMENTS

| | | | |
|---|---|---|---|
| 4,645,939 | 2/1987 | Robinson | 307/10.2 |
| 5,519,260 | 5/1996 | Washington | 307/10.5 |
| 5,519,376 | 5/1996 | Iijima | 340/426 |
| 5,539,260 | 7/1996 | Khangura et al. | 180/287 |

*Primary Examiner*—Richard T. Elms
*Attorney, Agent, or Firm*—Roger L. May

[57] ABSTRACT

A security system for an automotive vehicle having an engine is operatively connected between engine running electrical components that are connected to an electrical power source and a lock switch having at least two operative positions. The security system has a lock switch operator having a memory device carried thereon with a first security code stored in the memory device. A theft control module having a memory storing a second security code is operatively connected between the switch and the engine running electrical devices. The theft control module operates to first permit the engine running electrical components to enable the starting of the engine and then to compare the first and second security codes. Before starting the engine, a counter is compared to a predetermined number so that the engine starting is limited to only a predetermined number of attempts. The engine is disabled if the number of attempts exceeds the predetermined number. If the predetermined number is not exceeded the security codes are checked. Upon finding the first security code not equal to the second security code, the engine running electrical components are disconnected from the electrical power source to disable the engine. The system also may have a feature to allow the electronic engine controller to generate a code and send the code to the theft control module. The theft control module calculates a response based upon a secret algorithm. The electronic engine controller maintains the engine enabled if a code it calculates based on the same secret algorithm is equivalent to the response calculated in the theft control module.

1 Claim, 3 Drawing Sheets

METHOD AND APPARATUS FOR ENHANCED VEHICLE PROTECTION

RELATED APPLICATIONS

This is a divisional of application Ser. No. 08/586,448 filed Jan. 16, 1996 now U.S. Pat. No. 5,637,926.

This application is related to commonly assigned patent application 08/270,979 now U.S. Pat. No. 5,539,260 issued Jul. 23, 1996.

BACKGROUND OF THE INVENTION

The present invention relates generally to a key-activated security device for an automotive vehicle and more specifically to a method and apparatus controlling the operation of the security system.

Several security systems use two lines of defense. A first line of defense is a cut key that is used to operate the system if the cut of the key matches the lock in which it is inserted. A second line of defense is housing electronic circuitry on the key that has a unique identification code. When a properly cut key is inserted into the lock, a security device interrogates the electronic circuitry for its security code. If the security code is the proper lock operator, the engine is allowed to start.

The time between the interrogation of the electronic circuitry and the starting of engine may vary depending on such factors as humidity and temperature. One problem with prior security device is that if the engine starts a long duration after turning the key in the lock, operators perceive a problem.

Another drawback with prior security devices is that if the operator's vehicle does not start, no indication of the cause of the problem is indicated. In other words, the operator does not know whether the car is not starting because of a defective security system or whether the car is not starting because of a defect in the engine or associated components.

Related application Ser. No. 08/270,979 uses a transponder having a key code that is coupled to a theft control module through an antenna. The theft control module allows the vehicle to start before checking for a valid transponder code in the key to eliminate the delay between interrogating the key in the ignition and starting the engine. One drawback to the system is that the vehicle may be moved before the system is disabled if a valid key code is not found.

SUMMARY OF THE INVENTION

An object of the invention is to prevent an unauthorized user from moving the vehicle more than a small amount while still allowing the system to compensate for sporadic errors.

One advantage of the present invention is that security is further enhanced by the providing a confirmation routine between the theft control module and the electronic engine controller.

The security system according to the preferred embodiment of the present invention is operatively connected between engine running electrical components that are connected to an electrical power source and a lock switch having at least two operative positions. The security system has a lock switch operator having a memory device carried thereon with a first security code stored in the memory device. A counter counts the number of attempted starts of the engine. A theft control module having a memory storing a second security code is operatively connected between the switch, the counter and the engine running electrical devices. Before operating the rest of the system, the counter must not have exceeded a predetermined number. If the predetermined number has not been exceeded the theft control module operates to first permit the engine running electrical components to enable the starting of the engine and then to compare the first and second security codes. Upon finding the first security code not equal to the second security code, the engine running electrical components are disconnected from the electrical power source to disable the engine.

One feature of the invention is that if the first security code is equal to the second security code, the engine controller generates a challenge code that is sent to the theft control module and processed by a secret algorithm in the theft control module and returned to the engine controller. The engine control module also calculates a comparison number based on the same secret algorithm. If the comparison of the comparison number to the returned number is not equal the engine is disabled.

DETAILED DESCRIPTION OF THE PREFERRED EMBODIMENT

Figure 1:
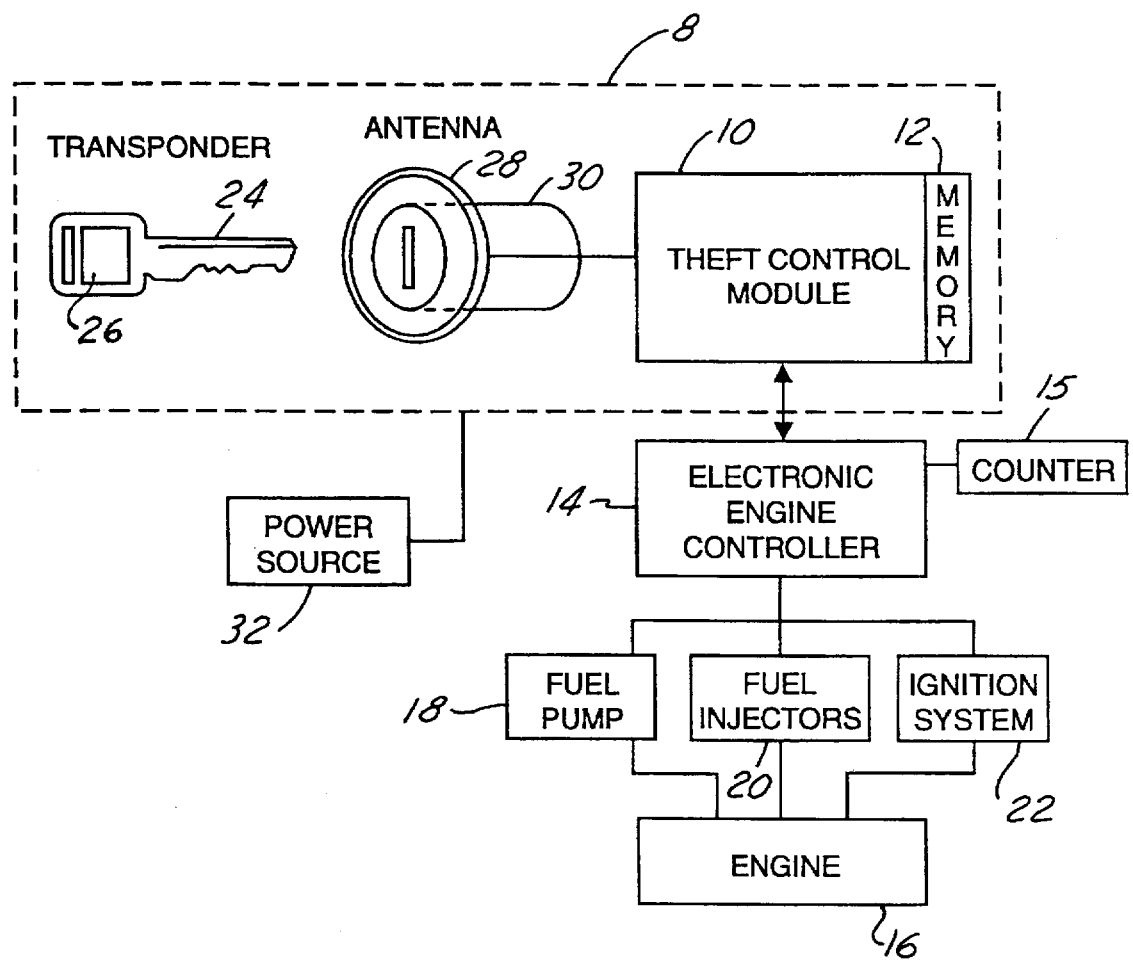
FIG. 1 is a block diagram of a security system according to the preferred embodiment of the invention.

Referring to FIG. 1, a security system 8 is connected to an electronic engine controller 14 and a power source 32. Electronic engine controller 14 receives power from power source 32 through security system 8. Security system 8 has a theft control module 10 having a memory 12.

Theft control module 10 is connected to an antenna 28 located around a lock switch 30 and is used to transmit and receive information to an electronic memory device such as a transponder 26 located on a key 24. Theft control module 10 is preferably microprocessor-based and has a variety of inputs and outputs for receiving and transmitting electrical signals.

Memory 12 of theft control module 10 stores a security code. Memory 12 is preferably a read only memory. Memory 12 is at a minimum is keep-alive memory and is preferably non-volatile memory such as an EEPROM. Keep alive memory is not cleared when the ignition is off since it is powered from the vehicle battery.

A counter 15 counts the number of unsuccessful starts of the ignition. As will be described below, if the number of unsuccessful starts exceeds a predetermined value the vehicle will not operate. Counter 15 may be physically located in theft control module 10 or preferably in engine controller 14. The attempted start value from counter 15 is stored in memory 12.

Theft control module 10 is connected to electronic engine controller 14 that is also preferably microprocessor-based. Electronic engine controller 14 controls the functioning of an engine 16 by controlling power to engine running electrical components such as a fuel pump 18, fuel injectors 20, and an ignition system 22. Electronic engine controller 14 may also controllable module such as an intelligent fuel pump for a diesel engine. Theft control module 10 and electronic engine controller 14 communicate using a series of control signals. As further described in conjunction with FIGS. 2A and 2B below, theft control module 10 provides a signal representing theft control status to electronic engine controller 14 consisting of engine disable and engine enable control signals. Theft control module 10 preferably uses an encoded digital control signal that is unique to each system. Providing a unique digital control signal decreases the opportunity for defeating the system by disconnecting theft control module 10 from electronic engine controller 14 and providing a simulated control signal in place of a signal sent from theft control module 10.

One way in which higher security between theft control module 10 and electronic engine controller 14 is for the engine controller 14 to send a digital challenge code to theft control module 10. Both electronic engine controller 14 and theft control module 10 have the same secret algorithm stored within them. Theft control module 10 receives the challenge code and processes the code through according to the algorithm and returns a processed code engine controller 14. Engine controller 14 processes the code it sent according to the secret algorithm. Engine controller 14 compares the received code to the code it calculated. If the codes are equivalent, the engine stays enabled. If the codes are not equivalent the engine is disabled.

Carried upon key 24 is an electronic memory device that stores a security code. In the illustrated preferred embodiment the electronic memory device is a transponder 26. Key 24 is used to operate lock switch 30. Theft control module 10 sends an interrogating signal to antenna 28 that is located proximate to the lock switch 30. Lock switch 30, for example, is preferably a commonly known rotatable ignition switch having at least two positions, e.g., an "off" and an "on" position. Lock switch 30 can also provide several positions commonly used in ignition switch such as a start position and an accessory position. When lock switch 30 is in the "on" position, power source 32 supplies power to theft control module 10 and electronic engine controller 14. Antenna 28 provides magnetic coupling to transponder 26 that energizes transponder 26 to transmit a security code by way of antenna 28 to theft control module 10. Theft control module 10 compares the security code received from transponder 26 to the security code stored in memory 12. If the received security code is not equal to the security code stored in memory 12 of theft control module 12, a disable engine control signal is sent to electronic engine controller 14.

Figure 2A:
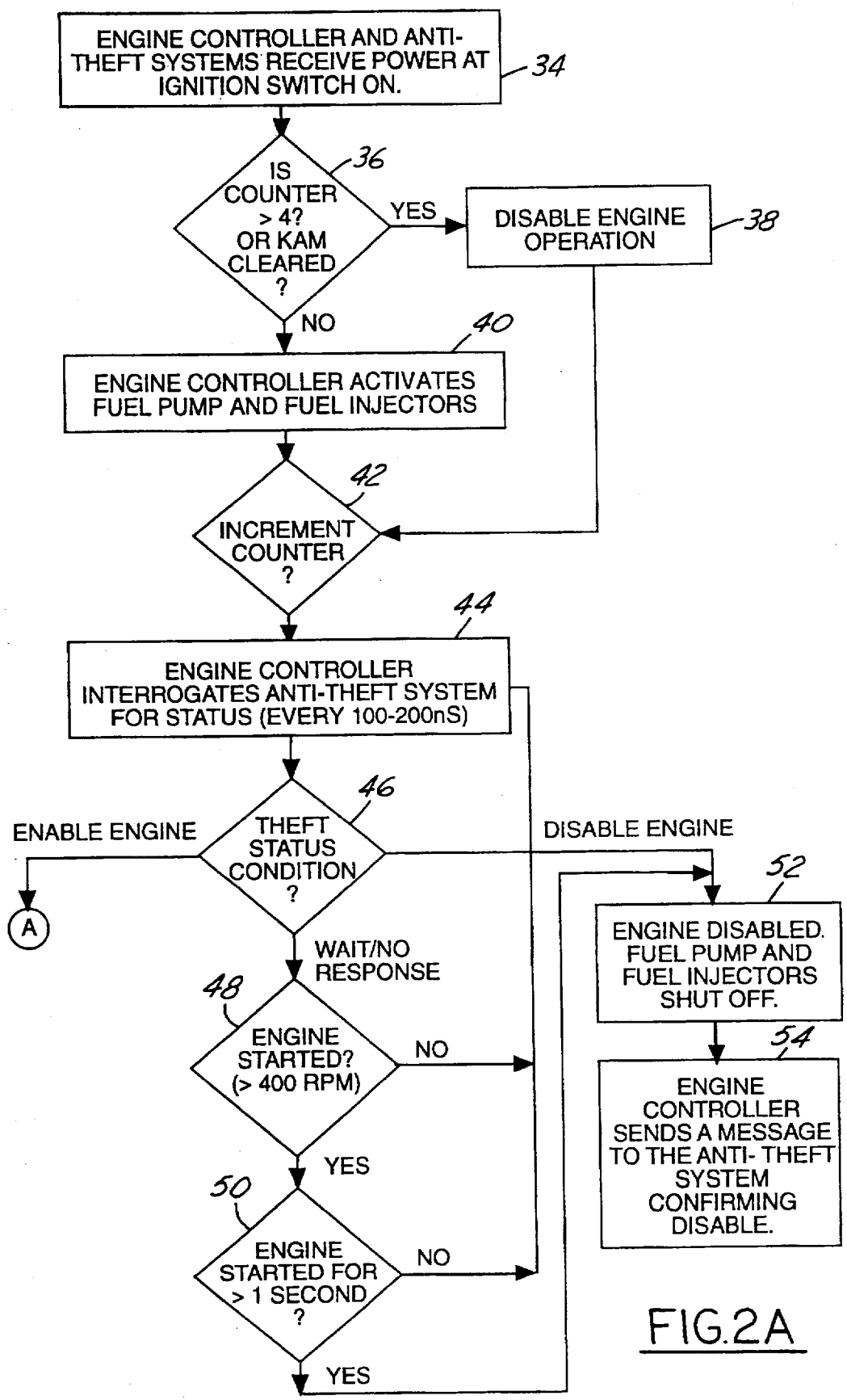
FIGS. 2A and 2B provide a flowchart of the method for operating the security system according to the preferred embodiment of the invention.
Figure 2B:
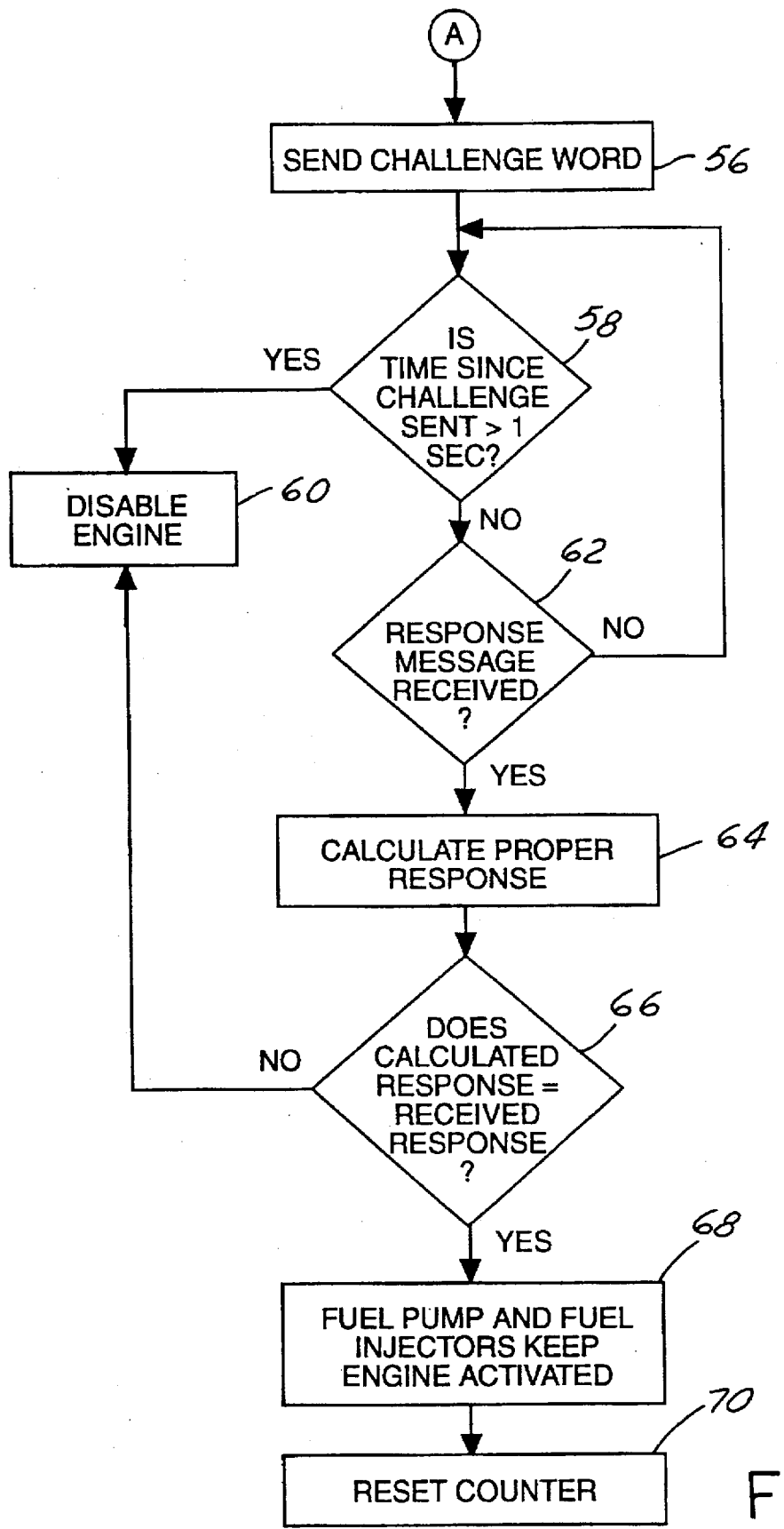

Referring now to FIGS. 1, 2A, and 2B, in block 34, key 24 is inserted into lock switch 30, key 24 is rotated to the "on" position (or a start position) to provide power to both theft control module 10 and electronic engine controller 14. Before allowing the electronic engine controller to start, the number of unsuccessful attempts of starting the engine is checked and if keep alive memory has been cleared if the system has been equipped with keep alive memory in block 36. If the number of unsuccessful attempts exceeds a predetermined value or keep alive memory has been cleared, step 38 disables engine operation. The vehicle will then be disabled. In operation a predetermined value of about five is preferred. Five has been chosen to allow any sporadic operation of the electronic engine controller or the theft control module to be factored out before disablement. Very few errors typically occur so five was chosen as a reasonable and safe number while not allowing an unauthorized operator from moving the vehicle very far. If the engine is disabled in step 38, the system continues in step 42 to increment the counter. The engine does not start but the presence of a valid key will enable the system so that an authorized user can enable the system with a properly coded key if his vehicle has been tampered with.

If the attempted start value has not exceeded the predetermined number, block 40 is executed. In block 40, electronic engine controller 14 powers engine running electrical components such as fuel pump 18, fuel injectors 20 and ignition system 22. In block 42, attempted start counter is incremented. In block 44, electronic engine controller 14 interrogates theft control module 10 for the theft status condition. For example, electronic engine controller 14 interrogates between every 100 to 200 msec.

In block 46, the theft status condition is checked for one of three conditions: if theft control module 10 has not responded, if theft control module 10 has responded and indicates enabling the engine or if theft control module 10 has responded and indicates disabling the engine.

If no response has been received from theft control module 10, the engine speed is checked in block 48 whether the engine speed is greater than a predetermined value corresponding to a value from which it will be known that the engine has started, e.g., 400 revolutions per second. If the engine has not responded and the engine speed is not over 400 RPM, the sequence returns to block 44. If the engine has reached 400 RPM, the sequence will continue to block 50 where the length of time the engine is started is checked. If the engine has not been started for more than 1 second, the sequence will loop back to block 44. One second represents the time it takes transient electrical signals in the electrical system to significantly damp out of the system. More reliable readings of the security code on the key are taken after transient signals subside. If the engine has been started for more than 1 second, a disable sequence is entered. Such a situation is likely when, for instance, the connection from theft control module 10 to electronic engine controller is severed by tampering. In such a situation, the disable engine branch is executed beginning in block 52 (further described below).

Referring back to block 46, if theft control module 10 has responded and the theft condition status indicates is an engine disable status, the engine is disabled when a disable engine control signal is sent from theft control module 10 to electronic engine controller 14. In block 52, the engine is disabled by electronic engine controller 14 removing power to the engine running electrical components such as shutting down fuel pump 18 and fuel injectors 20. Thereafter, in block 54 a confirmation signal is sent from electronic engine controller 14 to theft control module 10.

Referring back to block 46, if the theft status condition indicates an engine enable condition, the fuel injectors and fuel injectors may be allowed to remain activated. For added security, before electronic engine controller 14 allows the engine to remain enabled, electronic engine controller 14 sends a challenge word to the theft control module 10 in block 56. The challenge word is a code having a certain number of bits. The challenge code is operated on by the theft control module using a secret algorithm and sent back to electronic engine controller 14.

In block 58 the time since the challenge word was sent from the electronic engine controller 14 to the theft control module 10 is checked. If a time greater than a predetermined time has elapsed, the engine is disabled in block 60. The predetermined time is determined by the amount of time it should take the theft control module 10 to respond plus a factor of safety. In the present example, the predetermined time is one second. A time longer than the predetermined time occurs if the system has been tampered with.

If the time elapsed is less than one second, block 62 is executed. Block 62 inquires whether a response code was received. Ira response code has not yet been received, block 58 is again executed.

If a response code was received block 64 is executed. In block 64 the electronic engine controller 14 calculates a comparison code using the same secret algorithm. Block 66 checks whether the response received from the theft control module 10 is equal to the comparison code calculated in the electronic engine controller 14. If the comparison and response codes are not equal then step 60 is executed and the engine is disabled. If the calculations are equal, block 68 is executed. Block 68 keeps the engine enabled by not cutting power to the engine enabling components.

Upon successful completing the above steps, the unsuccessful attempt counter is reset to 0. The system starts again after the engine is shut off As would be evident to one skilled in the art, several modifications of the invention may be made while still being within the scope of the appended claims. For example, the time and number of counter values may be varied to meet the needs of an individual system.

I claim:

1. A method for operating a security system for an automotive vehicle having an engine including engine running electrical components and an electronic engine controller, said security system including a theft control module, a lock switch having a selected position providing power to the engine running electrical components, and a key for operating said lock switch and carrying an electronic circuit storing a first security code, wherein said electronic engine controller maintains an attempted start count corresponding to the number of attempts of starting said engine, and wherein said theft control module has a memory storing a second security code, said method comprising the steps of:

placing said key in said lock switch in said selected position;

comparing said attempted start count to a predetermined number;

disabling said engine from starting if said attempted start count exceeds said predetermined number;

starting said engine if said attempted start count does not exceed said predetermined number;

thereafter, comparing said first security code with said second security code; and if said first security code does not equal said second security code, disconnecting power to said engine running electrical components thereby stopping said engine.

* * * * *